(12) United States Patent  (10) Patent No.: US 7,519,041 B2
Cai  (45) Date of Patent: Apr. 14, 2009

(54) METHOD FOR IMPROVING RANDOM ACCESS CHANNEL PERFORMANCE

(75) Inventor: Zhijun Cai, Euless, TX (US)

(73) Assignee: Motorola, Inc., Schaumburg, IL (US)

( * ) Notice: Subject to any disclaimer, the term of this patent is extended or adjusted under 35 U.S.C. 154(b) by 592 days.

(21) Appl. No.: 11/318,245

(22) Filed: Dec. 22, 2005

(65) Prior Publication Data

US 2007/0147310 A1   Jun. 28, 2007

(51) Int. Cl.
  *H04Q 7/20* (2006.01)
(52) U.S. Cl. ........................ 370/342; 370/347
(58) Field of Classification Search .......... 370/342, 370/347
  See application file for complete search history.

(56) References Cited

U.S. PATENT DOCUMENTS 6,507,601 B2 * 1/2003 Parsa et al. ................ 375/141
7,103,060 B2 * 9/2006 Kornprobst et al. ......... 370/437
2007/0147326 A1 * 6/2007 Chen .......................... 370/338

* cited by examiner

*Primary Examiner*—Melvin Marcelo
(74) *Attorney, Agent, or Firm*—Brinks Hofer Gilson & Lione; John G. Rauch; Nathan O. Greene (57) ABSTRACT

A user equipment, for use in a wireless communication system, comprises a receiver to receive resource usage information transmitted from a base station over an acquisition (or acknowledgement) indicator channel, and a controller operatively coupled to the receiver, to determine an available resource, with a high probability of success, based on the received resource usage information. A transmitter operatively coupled to the controller, is provided to transmit an access attempt signal and data packets over a random access channel, with the access attempt signal adapted to the available resource to request the base station to permit the user equipment access to the random access channel.

18 Claims, 6 Drawing Sheets

METHOD FOR IMPROVING RANDOM ACCESS CHANNEL PERFORMANCE

FIELD OF INVENTION

The present invention relates, generally, to wireless communication systems, and more particularly, to a method for improving random access channel performance for user equipments in a wireless communication system.

BACKGROUND

Typically, base stations communicate with user equipments (UEs) in their corresponding operating areas or cells. A random access channel is used for carrying packets of data from a plurality of UEs on a contention basis. The random access channel is utilized in wireless communication systems such as the spread spectrum code division multiple access (CDMA) systems and the orthogonal frequency division multiplexing (OFDM) systems. In the exemplary embodiment, the CDMA systems are considered. However, the method can also be used in the OFDM systems. In CDMA systems, data signals are communicated between UEs and corresponding base stations over a shared spread spectrum.

Generally, in CDMA systems a random access channel (known as RACH) is used for carrying packets of traffic data from a plurality of UEs on a contention basis. In addition to handling call origination and registration messages, the RACH in Third Generation Partnership Project (3GPP) will carry traffic including Short Messaging Service (SMS) packets and possibly short data bursts in the absence of a dedicated traffic channel. The Third Generation Partnership (3GPP) is a collaboration agreement that was established in December 1998, from a co-operation between the European Telecommunications Standards Institute (ETSI), Association of Radio Industries and Businesses (ARIB) of Japan, CCS (China), Alliance for Telecommunications Industry Solutions (ATIS) of North America and TTA of South Korea. A goal of 3GPP was to make a globally applicable third generation (3G) mobile phone system specification within the scope of the International Telecommunication Union's (ITU) International Mobile Telecommunications-2000 (IMT -2000) project. 3GPP specifications are based on evolved GSM specifications, known as the Universal Mobile Telecommunications System (UMTS) system.

Because of such increase in traffic volume, accurately predicting performance of RACH and sizing communication resources appropriately has become important. The RACH, being an uplink transport channel, is generally characterized by a collision risk and by being transmitted using open loop power control. Each packet is distinguishable by a combination of time slots and codes. The transmission is time divided into repeating frames having time slots, such as fifteen time slots per frame. When a packet is transmitted over the RACH, it may last for multiple frames.

RACH throughput has commonly been assumed to be comparable to that of slotted ALOHA. ALOHA is a protocol for satellite and terrestrial radio transmissions. In pure ALOHA, a UE can transmit a message at any time but risks transmission collisions with other users' messages. A slotted ALOHA reduces the chance of collisions by dividing the channel into time slots and requiring that the UE transmits only at the beginning of a time slot.

Over the RACH, a random-access transmission is generally based on the slotted ALOHA approach with fast acquisition indication. A typical UE RACH access attempt is as follows. Prior to communicating over the RACH, a UE transmits an access signal to the base station or Node B to access the RACH. One type of access signal uses a preamble code in a preamble signal (hereafter referred to as the preamble). Generally, the UE repeats the preamble while incrementally increasing transmission power levels. The UE repeats transmission of the preamble until a response from the base station is received or until a maximum number of repetitions is reached.

Typically, when attempting to access the RACH, UEs randomly select the preamble sequence which corresponds to a determined resource in the base station. This randomness generally increases a collision probability between the UEs, and thus reduces the RACH throughput. Moreover, a period of time between access attempts is critical to a system's performance. If the period between access attempts is substantially long, the RACH will be underutilized. If the period is substantially short, an undesirably high number of UEs may repeatedly request access resulting in service interruptions.

A number of approaches, known in the available body of literature, aim to improve the RACH throughput. One such approach for controlling UE re-access attempts is to use a fixed backoff parameter. The UE typically reattempts access for a period of time based on the backoff parameter. The backoff parameter represents a deterministic wait period for an access reattempt. A problem with a fixed backoff parameter is a lack of adjustment in response to a cell loading. The cell loading refers to the number of UEs in established communication with a corresponding base station. Accordingly, during periods of light cell loading, the RACH may be underutilized and in periods of high loading service interruptions may result.

Another known approach is a rule based approach, in which the UE analyzes its prior access attempt statistics. Based on the access statistics, the UE determines a backoff parameter by applying predetermined rules. If the UE had many unsuccessful access attempts, the period between attempts is increased. Since the UE's prior access attempts may not represent current conditions, this rule based approach is not optimal.

Another known approach is a broadcast of a backoff parameter over a broadcast channel (BCH). The broadcasted backoff parameter is based on the RACH's loading, uplink interference level and other factors. The broadcasted backoff parameter is used to derive a backoff wait period at a targeted access time. However, due to delays in processing and transmitting the broadcasted backoff parameter, the broadcasted backoff parameter, which may not represent current conditions, is not optimal.

Accordingly, there is a need for addressing the problems noted above and others previously experienced.

Illustrative and exemplary embodiments of the invention are described in further detail below with reference to and in conjunction with the figures.

DETAILED DESCRIPTION OF THE PRESENT EMBODIMENTS

The present invention is defined by the appended claims. This description summarizes some aspects of the present embodiments and should not be used to limit the claims. While the present invention may be embodied in various forms, there is shown in the drawings and will hereinafter be described some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a and an" object is intended to denote also one of a possible plurality of such objects.

A method for improving random access channel performance for user equipment in a telecommunication system, such as a wireless code division multiple access channel communication system (CDMA), is provided. The method comprises receiving resource usage information transmitted from a base station over an acquisition (or acknowledgement) indicator channel, determining an available resource, with a high probability of success, based on the received resource usage information. The method further comprises transmitting an access attempt signal and data packets over a random access channel, the access attempt signal adapted to the available resource to request the base station to permit the user equipment access to the random access channel.

In another feature, user equipment, for use in a wireless code division multiple access communication system, is provided. The user equipment comprises a receiver for receiving resource usage information transmitted from a base station over an acquisition (or acknowledgement) indicator channel, a controller operatively coupled to the receiver, the controller for determining an available resource, with a high probability of success, based on the received resource usage information, and a transmitter operatively coupled to the controller, the transmitter for transmitting an access attempt signal and data packets over a random access channel, the access attempt signal adapted to the available resource to request the base station to permit the user equipment access to the random access channel.

Figure 1:
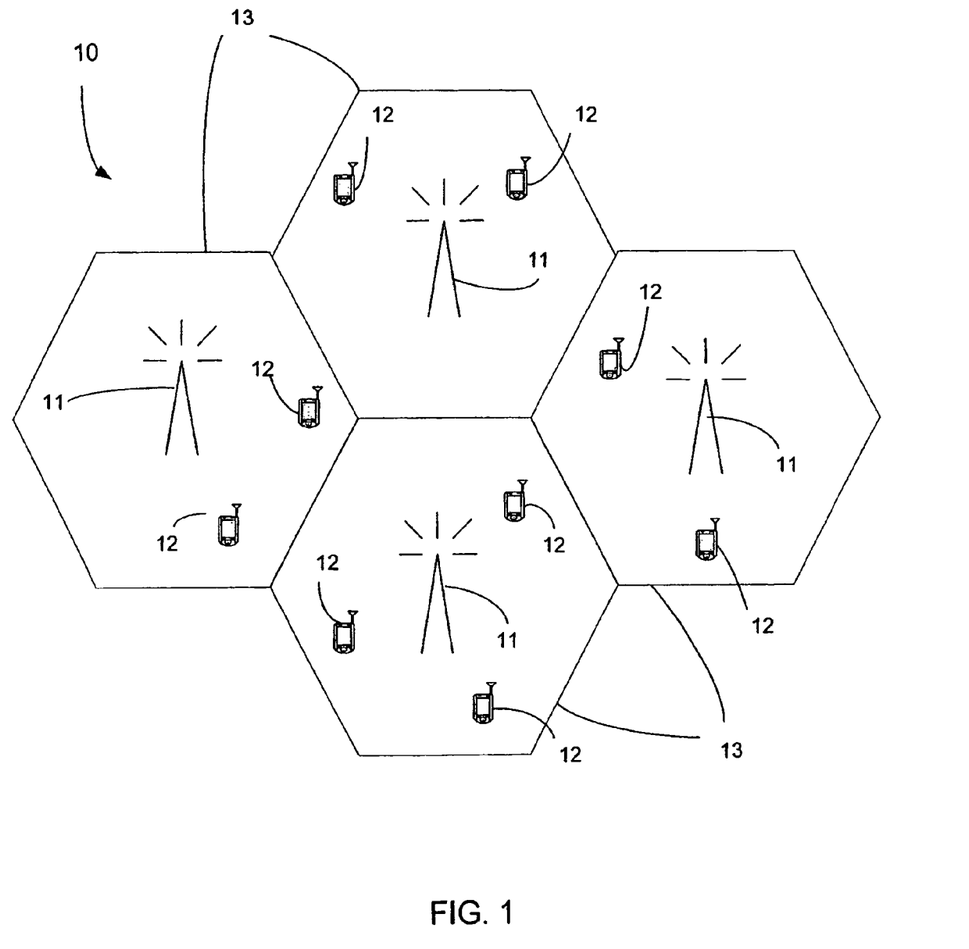
FIG. 1 illustrates an example communication network illustrating a wireless CDMA communication system.

Referring to FIG. 1, a wireless spread spectrum CDMA communication system 10 is shown. A base station B 11 is shown with a plurality of UEs 12 within a communication area or cell 13. In this communication cell 13, each UE 12 exchanges data signals with base station 11 over a shared spread spectrum. Each data signal in the shared spectrum is spread with a predetermined distinct code structure. Upon reception, using a replica of the distinct code structure, a corresponding data signal is decoded. Due to these distinct code structures, data signals are communicated over distinctly dedicated communication channels. As such, downlink channels are dedicated to signals communicated from the base station 11 to the plurality of UEs 12 and uplink channels are dedicated to signals communicated from the plurality of UEs 12 to the base station 11.

Figure 2:
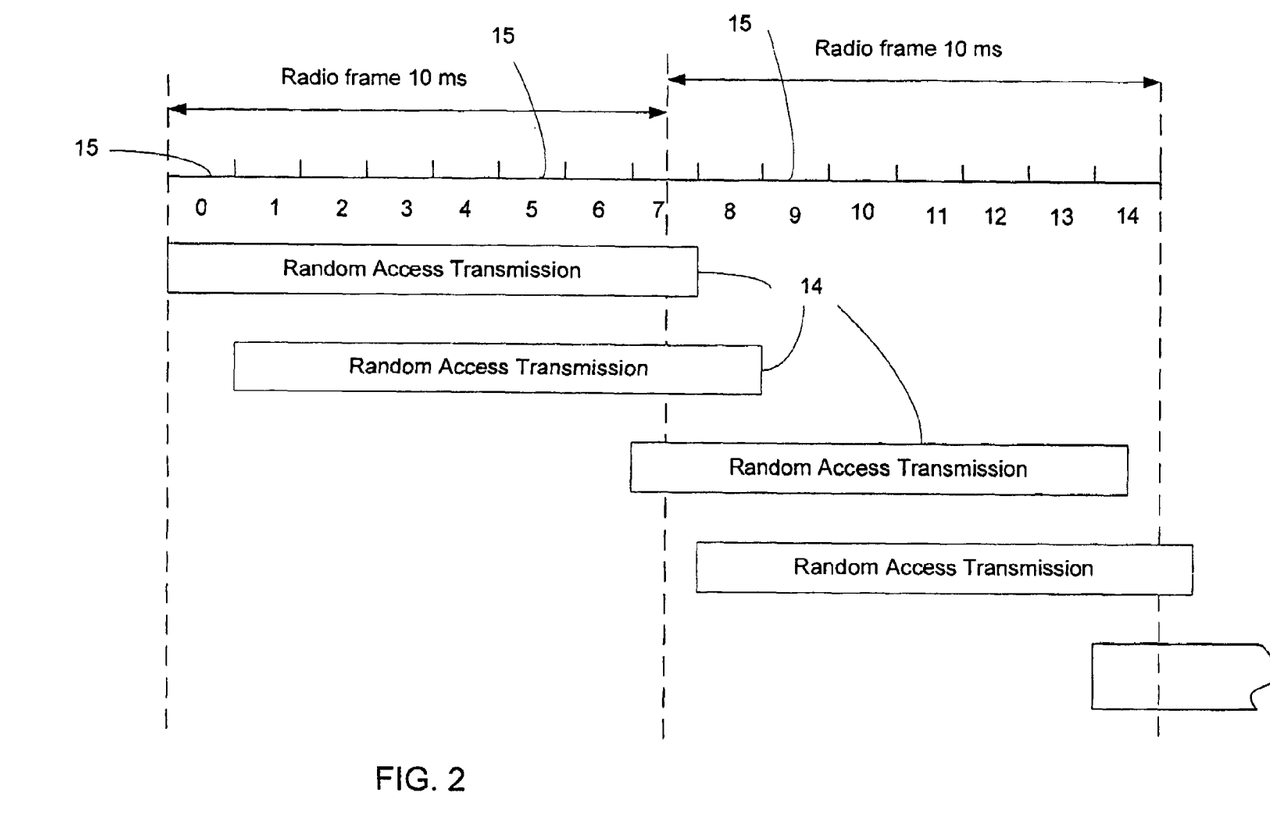
FIG. 2 is a graph illustrating a PRACH structure.

Now referring to FIG. 2, a graph illustrating an example of a physical RACH (PRACH) structure in CDMA systems is shown. This PRACH structure includes fifteen defined time intervals, denoted as access slots 15 and referenced with numbers 0 to 14. These access slots 15 are spaced 5120 chips apart and determine two (2) radio frames. As shown, a random access transmission 14 may start at the beginning of any number of well-defined access slots 15. In FIG. 2, random access transmissions 14 are shown beginning at five access slots 15 numbered 0, 1, 7, 8, and 14. The structure of one example of the random-access transmission 14 is further detailed in FIG. 3. The random access transmission 14 includes one or several preambles 16 and a message part 17. Each RACH preamble 16 has a length 4096 chips and includes 256 repetitions of a signature of length 16 chips. There is a maximum number of 16 available signatures. All 16 signature codes are available in every cell. The RACH message 17 of length 10 or 20 ms, i.e. one radio frame or two radio frames, respectively.

Figure 3:
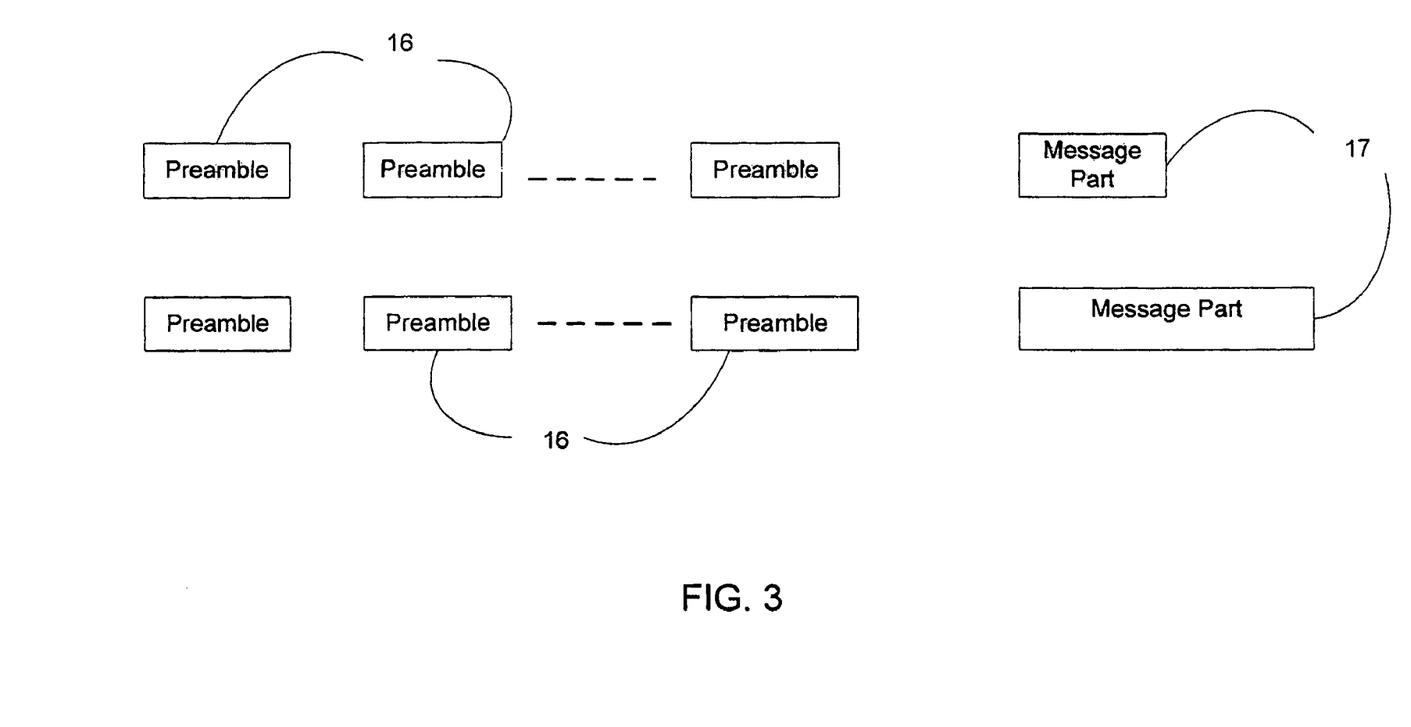
FIG. 3 is a diagram illustrating graph a random access transmission structure.

Before sending a relatively short message, embedded in an uplink data signal, each UE 12 transmits the preamble 16 during one access slot of 1.33 ms. Each preamble 16 is encoded by one of 16 code structures or signatures, which can be detected and acknowledged by base station 11. Each signature assigned to the preamble 16 determines one of sixteen (16) nodes in a code-tree containing spreading code, referred to as channelisation codes. A sub-tree of each of these nodes is used to assign the spreading code of message 17. Hence, the signature is resource-related, and base station 11 informs or notifies UEs 12 which signatures are received over an acquisition (acknowledgement) indicator channel (AICH).

Based on this signature notification, UE 12 may utilize resource sensing prior to access attempts to improve the RACH throughput. This resource sensing may be substantially useful when a relatively small amount of uplink data traffic may overload the RACH. Typically, when UE 12 selects a preamble signature, such selection is performed randomly from an assigned access service class (ASC). Moreover, UE 12 has generally no information on which resource, (channelisation codes that correspond to the signature) is better suited for the message transmission. However, base station 11 generally provides such information over the AICH.

Figure 4:
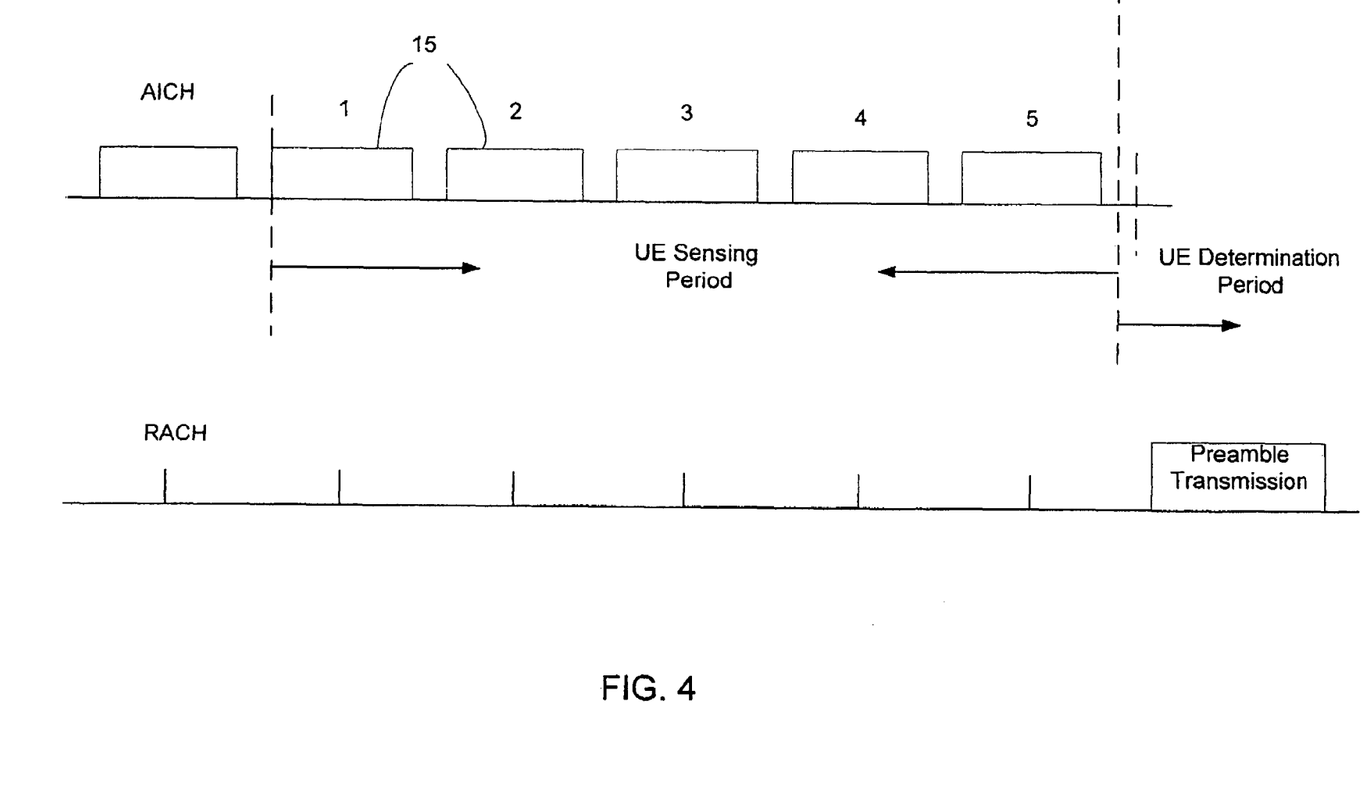
FIG. 4 is a block diagram illustrating a user equipment and a base station.

Now referring to FIG. 4, a graph illustrates an AICH and a RACH with multiple access slots 15 providing for UE 12 a resource sensing period to determine an available RACH resource. Prior to transmitting preamble 16, UE 12 may enter a sensing period to analyze information data transmitted by base station B 11 over AICH for multiple access slots, so as to determine the available resource usage of base station 11. Such resource usage information may enable UE 12 to determine the available resources with substantially high success probability for the access attempts.

Figure 5:
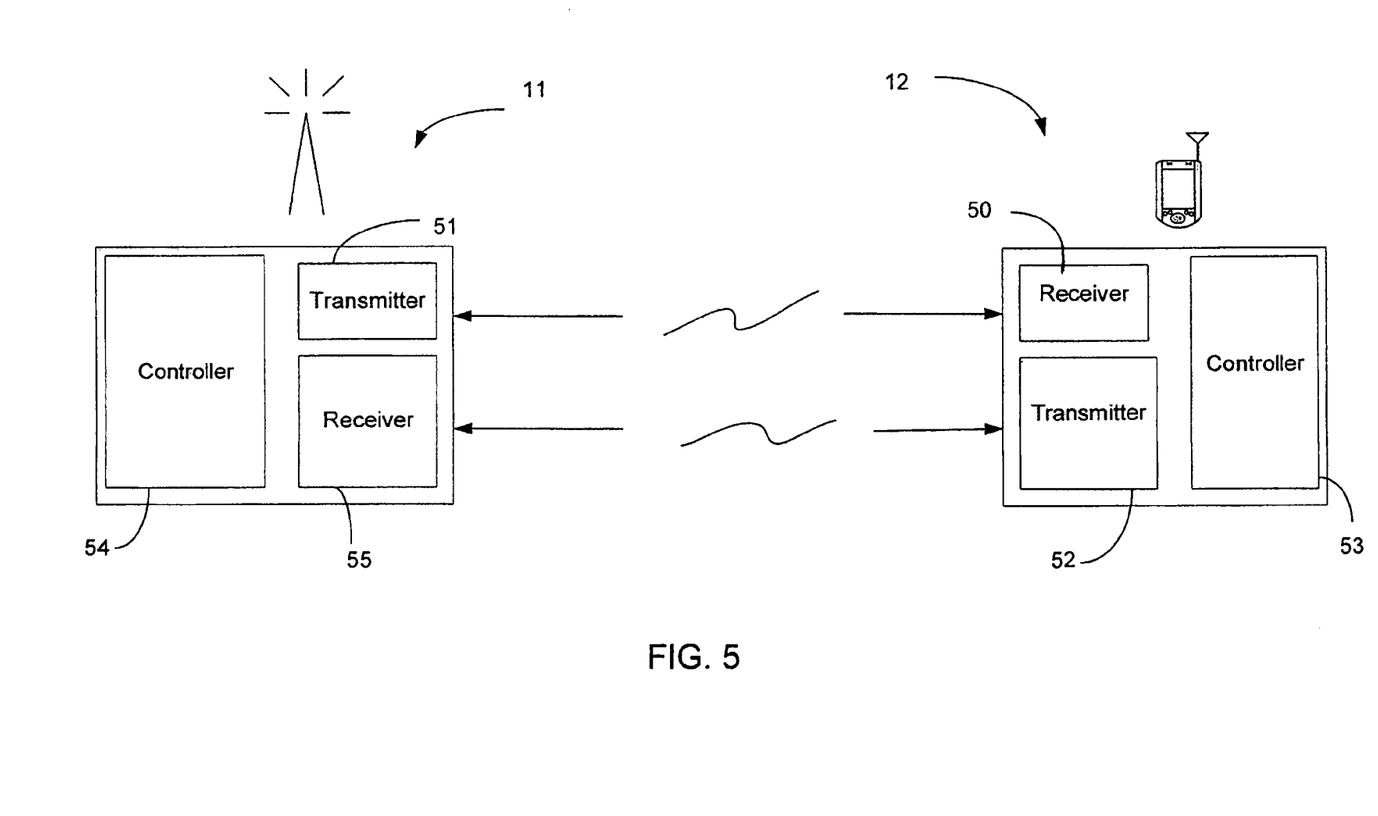
FIG. 5 is a graph illustrating a user equipment determination of an available RACH resource.

In FIG. 5, a block diagram illustrates a UE 12 in communication with a base station B 11 along with their communication elements. When UE 12 attempts to transmit, via a transmitter 52, a short message over the RACH, UE 12 receives, via a receiver 50, the ASC from a controller 54 transmitted via a transmitter 51 of base station B 11. Once the ASC is received, UE 12 starts a resource sensing period to try to determine the resource usage status of base station 11 via a controller 53. For the sake of simplicity and without loss of generality, the ASC assigned to UE 12 may allow UE 12 to utilize preamble signatures 1, 3, 5, 7, 9, 11, 12 and 16.

As shown in FIG. 5, UE 12 receives acquisition data from the AICH for five (5) access slots 15 via receiver 50. Then via controller 53, UE 12 determines that the AI message in access slot 1 15 reveals that signatures 1 and 3 are negative acknowledgement (NAK) feedback signals and signature 11 is an acknowledged signal (ACK) feedback signal. Moreover, UE 12 determines from access slot 2 15 of the AI message that signature 5, 6 are NAK signal feedbacks, and that signature 8 is an ACK feedback signal. Further, UE 12 determines from access slot 3 15 of the AI message that signature 9 is NAK feedback signal, and from access slot 4 15 that signature 1 and 5 are NAK feedback signals. Still further, UE 12 determines from access slot 5 15 of the AI the AI message that signature 9 is a NAK signal and that 11 is an ACK signal.

Accordingly, UE 12 has determined that signatures 1, 3, 5, 9, 11 are in-use, and may select from the 7, 12, or 16 signatures to begin a preamble transmission to receiver 55 of base station 11. Thus, the ACK and NACK information over the AICH can be efficiently and appropriately utilized to enable UE 12 to determine the current resource usage status in base station 11. However, in the event that all signatures are in use, then a backoff wait period is observed before resuming another resource sensing period. This backoff wait period can be observed via a number of backoff procedures.

Figure 6:
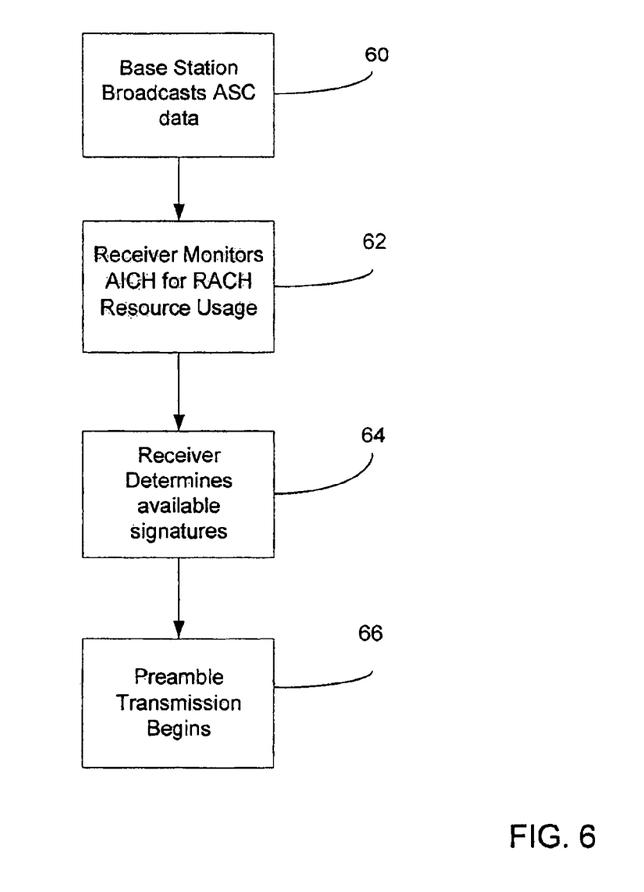
FIG. 6 is a flow chart illustrating a method for improving a RACH performance based on resource sensing.

Now referring to FIG. 6, a flow chart illustrating a method for improving a RACH performance based on resource sensing is shown. At step 60, base station 11 broadcasts ASC information data. UE 12 monitors the AICH for the resource usage information for a number of access slots via receiver 50, at step 62. Then, at step 64 UE 12 determines which signatures are available to begin a preamble transmission, at step 66.

The proposed method utilizes AICH to enable resource-sensing by UE 12, thereby improving the RACH performance. In this method, UE 12 can use resource sensing before entering the preamble selection and transmission periods with a substantially high access success probability. This proposed method becomes significantly more efficient when the load of the RACH is increased.

The above described method may be performed by the application on a processor using instructions that may reside on a computer-readable medium. The computer-readable medium may be any suitable computer readable storage medium such as, but not limited to random access memory, read-only memory, flash memory, solid-state memory, magnetic memory, optical memory, and the like.

It is therefore intended that the foregoing detailed description be regarded as illustrative rather than limiting, and that it be understood that it is the following claims, including all equivalents, that are intended to define the spirit and scope of this invention.

The invention claimed is:

1. A method for improving random access channel performance by a user equipment in a wireless communication system, the method comprising:
   receiving resource usage information transmitted from a base station over an indicator channel;
   determining an available resource based on the received resource usage information using negative acknowledgment (NAK) and acknowledgement (ACK) feedback signals from the base station associated with an assigned access service class, wherein determining the available resource is performed before entering access resource selection and transmission periods; and
   transmitting an access attempt signal and data packets over a random access channel of the assigned access service class, the access attempt signal adapted to the available resource to request the base station to permit the user equipment access to the random access channel.

2. The method of claim 1, further comprising:
   transmitting the resource usage information from a base station over an acquisition or acknowledgement indicator channel.

3. The method of claim 1, wherein the resource usage information comprises information on at least one of available preamble signatures in CDMA systems and available time-frequency resources in OFDM systems.

4. The method of claim 3, further comprising:
   assigning information about available preamble signatures or time-frequency resources by an access service class.

5. The method of claim 1, wherein the available resource is determined with a high probability of success for the access attempts.

6. The method of claim 1, further comprising:
   observing a backoff wait period when no resource is determined to be available based on the received resource usage information.

7. The method of claim 6, further comprising:
   resuming another resource sensing period after observing the backoff wait period.

8. The method of claim 6, wherein the backoff wait period is implemented via a predetermined backoff procedure.

9. A user equipment for use in a wireless communication system, the user equipment comprising:
   a receiver operable to receive resource usage information transmitted from a base station over an indicator channel;
   a controller, operatively coupled to the receiver, to determine an available resource, based on the received resource usage information using negative acknowledgment (NAK) and acknowledgement (ACK) feedback signals from the base station associated with an assigned access service class, wherein the available resource is determined before entering access resource selection and transmission periods; and
   a transmitter, operatively coupled to the controller, to transmit an access attempt signal and data packets over a random access channel of the assigned access service class, the access attempt signal adapted to the available resource to request the base station to permit the user equipment access to the random access channel.

10. The user equipment of claim 9, wherein the resource usage information is transmitted from a base station over an acquisition or acknowledgement indicator channel.

11. The user equipment of claim 9, wherein the resource usage information comprises information about available preamble signatures or time-frequency resources.

12. The user equipment of claim 11, wherein information about available preamble signatures or time-frequency resources is assigned via an access service class.

13. The user equipment of claim 9, wherein the available resource is determined with a high probability of success.

14. The user equipment of claim 9, wherein the resource usage information comprises channelization codes that correspond to the preamble signatures or corresponding time-frequency resources.

15. The user equipment of claim 9, wherein the controller establishes a backoff wait period when no resource is determined to be available based on the received resource usage information.

16. The user equipment of claim 15, wherein the controller resumes the determination of the available resource after observing the backoff wait period.

17. The user equipment of claim 15, wherein the controller implements the backoff wait period via a predetermined backoff procedure.

18. A user equipment for use in a wireless code division multiple access communication system, the user equipment comprising:
   receiver means for receiving resource usage information transmitted from a base station;

controller means for determining an available resource, based on the received resource usage information using negative acknowledgment (NAK) and acknowledgement (ACK) feedback signals from the base station associated with an assigned access service class, wherein determining the available resource is performed before entering access resource selection and transmission periods; and transmitter means for transmitting an access attempt signal and data packets over a random access channel of the assigned access service class, the access attempt signal adapted to the available resource to request the base station to permit the user equipment access to the random access channel.

* * * * *